July 2, 1929.  A. GAZDA  1,719,007
SPRING HANDLE BAR FOR MOTOR CYCLES AND THE LIKE
Filed Sept. 20, 1926
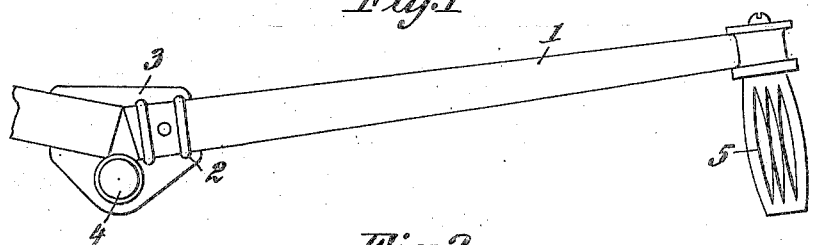
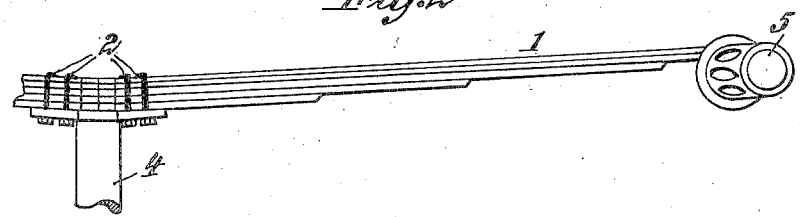
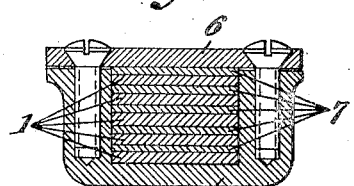
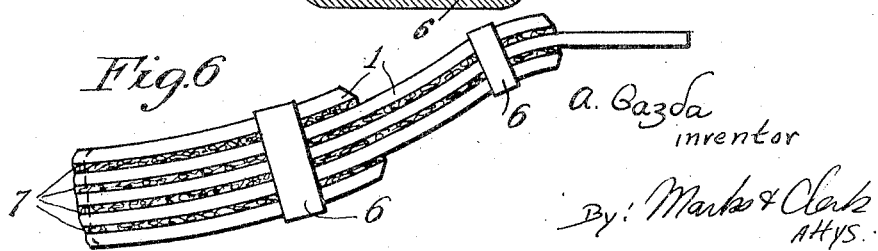

Patented July 2, 1929.

1,719,007

UNITED STATES PATENT OFFICE.

ANTON GAZDA, OF VIENNA, AUSTRIA.

SPRING HANDLE BAR FOR MOTOR CYCLES AND THE LIKE.

Application filed September 20, 1926, Serial No. 136,598, and in Austria September 26, 1925.

This invention relates to an improved handle bar for cycles or motor cycles and the essential feature consists in that the handle bar is composed of more than two leaf springs of different lengths so as to form a stepped leaf spring, whereby the ends of the handle bar remain practically at rest in the middle thereof and disagreeable self oscillations are avoided.

A further feature of the present invention consists in that a layer or layers of a friction and force absorbing material (for instance ferrodo) is or are interposed between the individual plates of the spring, which preferably are of different camber or curvature with respect to one another.

Two modes of carrying out the present invention is illustrated by way of example on the accompanying sheet of drawings in which:—

Figs. 1 and 2 show a handle bar in plan view and front view respectively.

Figs. 3 and 4 illustrate a modified embodiment of a handle bar in plan view and front view respectively, and Fig. 5 is a cross-sectional view on an enlarged scale.

Fig. 6 is an enlarged detail view, showing an elevation of one side of the handle-bar shown in Fig. 4.

In the construction shown in Figs. 1 and 2, a laminated spring 1 is mounted on a holder 3, which illustrated embodiment is formed integral with the shank of the shank 4, the spring being secured to the holder by means of clamping yokes 2 or in any other convenient manner. Grips 5 are secured at any convenient angle to the free ends of the spring 1.

In the construction illustrated in Figs. 3, 4, 5 and 6, strips 7 of leather, ferrodo or any other frictional material are interposed between the plates of the spring 1, the stirrups and plates being held together by tensioning buckles 6 or the like. Owing to this arrangement the movement between the plates of the spring is rendered more difficult, so that the vibration is absorbed and thus prevents a free oscillation of the spring.

The tensioning buckles 6 can be radially adjusted by means of screws, or the like, in order to conveniently regulate the shock-absorbing effect.

It is to be understood, that with the same construction the same effect may be obtained in the case of springs for vehicles and motor cars or the like.

I claim:—

1. A resilient handle bar for cycles or motor cycles comprising a number of leaf springs of different lengths and different camber with respect to one another, and a friction absorbing material interposed between the individual leaf springs.

2. A resilient handle bar for cycles or motor cycles comprising a number of leaf springs of different lengths and different camber with respect to one another, a friction absorbing material interposed between the individual leaf springs, tensioning buckles for holding together the leaf springs, and means for regulating the shock-absorbing effect.

In testimony whereof I affix my signature.

ANTON GAZDA.